United States Patent [19]
Williams et al.

[11] Patent Number: 5,419,281
[45] Date of Patent: May 30, 1995

[54] BACKPACK-STYLE ANIMAL CARRIER AND RESTRAINT

[76] Inventors: Sandy Williams; Joseph L. Williams, both of 32 Innisbrook Ave., Las Vegas, Nev. 89113

[21] Appl. No.: 265,655

[22] Filed: Jun. 24, 1994

[51] Int. Cl.6 .............................................. A01K 29/00
[52] U.S. Cl. ...................................... 119/19; 119/756; 224/245; 224/159
[58] Field of Search ...................... 119/28.5, 158, 752, 119/756, 771, 19; 224/158, 159, 211, 213, 245, 262, 210, 215, 216

[56] References Cited

U.S. PATENT DOCUMENTS

| | | | |
|---|---|---|---|
| 1,992,849 | 2/1935 | Walter | 224/216 |
| 2,130,976 | 9/1938 | Stone | 224/216 |
| 3,150,640 | 9/1964 | Nevitt . | |
| 3,547,079 | 12/1970 | Bassett . | |
| 3,765,375 | 10/1973 | Young | 119/771 |
| 4,010,880 | 3/1977 | Guillot-Manoz | 119/28.5 |
| 4,747,526 | 5/1988 | Launes | 224/159 |
| 4,925,071 | 5/1990 | Fleming et al. | 224/210 |
| 4,977,857 | 12/1990 | Slawinski . | |
| 5,044,321 | 9/1991 | Selph | 119/19 |
| 5,148,956 | 9/1992 | Funk . | |
| 5,176,102 | 1/1993 | Tracy | 119/19 |
| 5,178,098 | 1/1993 | Samberg | 119/756 |
| 5,193,486 | 3/1993 | Kitchens . | |
| 5,230,304 | 7/1993 | Santoro . | |
| 5,269,260 | 12/1993 | Farrell et al. | 119/158 |
| 5,277,148 | 1/1994 | Rossignol et al. . | |

Primary Examiner—Gene Mancene
Assistant Examiner—Todd E. Manahan
Attorney, Agent, or Firm—Quirk & Tratos

[57] ABSTRACT

A device is provided for restraining an animal for transport, which device can be worn by a user or secured in an automobile. The device includes an animal enclosure secured to a frame. The frame is a rigid member comprising first and second frame halves and a support leg. The enclosure includes a lower animal support surface, an upstanding wall, and an open top surface. Straps for adjusting the distance between the lower animal support surface and the top surface are provided for maintaining the head of the animal placed in the enclosure above the top surface of the enclosure. Collar restraining loops are also provided for centrally restraining the animal within the enclosure. Shoulder straps and a waist strap are located on the device allowing a user to wear the entire device on his or her body.

17 Claims, 4 Drawing Sheets

BACKPACK-STYLE ANIMAL CARRIER AND RESTRAINT

FIELD OF THE INVENTION

The present invention relates to devices for use in transporting and entertaining an animal. In particular, the present invention relates to a backpack device that can be worn by a user, or secured to the seat of an automobile for transporting an animal.

BACKGROUND OF THE INVENTION

It has become increasingly popular for owners of pets to take their pets on outdoor outings and activities. For instance, pets often accompany their owners on hikes or walks, and sometimes even when their owner rides a bicycle. Further, pets often ride in the car when their owner runs an errand or takes a trip.

Most pets are not adapted for traveling with their owners on long hikes or over rough terrain. Further, most animals cannot keep up when their owners are riding a bicycle. Lastly, while many pets are well trained, many do not behave satisfactorily in an automobile and must be restrained in some fashion to avoid damage to the automobile or distraction of the driver.

Until the present time, there has been no satisfactory method for transporting animals when engaging in these and similar activities. First, from the standpoint of the user, no satisfactory means exists for carrying an animal while engaging in activities such as walking, hiking or cycling. Second, no means exists for securely retaining an animal in a vehicle. Thirdly, no means exists for carrying and restraining an animal that is comfortable and enjoyable for the animal.

SUMMARY OF THE INVENTION

A backpack for use in transporting and securing animals is provided. In general, the backpack device of the present invention comprises a frame having an animal engaging enclosure secured thereto.

The frame includes first and second rigid metal frame halves, each of which includes a support member having a first end for contacting a surface and a second end which includes a flat or straight enclosure supporting portion. A strut connects the second end of each support member to an intermediate portion of the support member. A "U"-shaped support leg having first and second ends and a central flat support portion is hingedly connected to the first and second frame members.

The enclosure includes a bottom, upwardly extending wall, and an open top surface. Preferably, the enclosure comprises a durable fabric material. The enclosure is secured to the flat portion near the second ends of the first and second frame halves by loops that surround the frame members. A strap connects opposite sides of the enclosure wall and passes across each of said frame members, further securing the enclosure to the frame.

An animal is supported in the enclosure by a support surface. The support surface may comprise the bottom of the enclosure, or a portion of the side wall when the base is pulled upwardly towards the top surface with adjustment means. The adjustment means preferably comprises straps connected to the bottom of the enclosure and the side wall near the top surface. Adjustment of the adjustment means varies the distance between the animal support surface and the top surface of the enclosure.

Animal restraint means are connected to an inside surface of the enclosure near the top surface. The restraint means preferably comprises four loops located equidistantly about the inside of the enclosure. In one form, a first end of each loop is connected to the enclosure, and a second end of each loop is connected to the first end of the loop or the enclosure with a snap. In a second form, both ends of the loop are connected to one another and/or the enclosure. The loops support a collar or other restraint device located around the animal's neck and center and stabilize the animal within the enclosure.

User support means are connected to the frame and enclosure. In particular, shoulder straps are connected to the enclosure near the top surface and extend downwardly towards the first ends of the frame halves. The straps include a user engaging portion and an adjustment strap. Further, a waist support and waist strap are connected to the frame at the first ends of the frame members.

In use, a user extends the leg of the frame outwardly from the first ends of the frame members. In that position, the leg and the first ends of the frame members support the frame and enclosure on a stable surface. A user then lowers an animal into the enclosure, rear feet first. If the animal is wearing a collar, the user unfastens the collar from the animal, passes it the loops, and then secures it about the animal's neck. The user then adjusts the distance between the support surface and the top surface of the enclosure with the adjustment means so the animal's head protrudes from the top of the enclosure for maximum animal comfort and enjoyment.

A user may wear the device by locating his or her arms through the shoulder straps and lifting the device onto their body. The user may then connect and adjust the waist strap about their waist to secure the lower portion of the device to their body. The leg is retracted towards the first ends of the frame members, reducing the space occupied by the frame.

A user may also locate the device securely in the seat of an automobile. The user simply places the device on the seat of the automobile, with the support leg extended towards the front of the automobile. The user then runs a seat belt, including the shoulder harness if present, across the frame and buckles it, securing the device in the seat.

In accordance with the present invention, when a user secures an animal within the enclosure, the restraint means prevents the animal from escaping the enclosure. Further, the restraint means centrally locates the animal in the enclosure, allowing free movement of air about the animal's body. The central location also prevents the animal from shifting from one side of the device to the other, which might result in the device tipping over or the balance of the wearer shifting suddenly.

The means for adjusting allows the user to adjust the device such that the animal's head always extends above the top surface of the enclosure, no matter what size of animal is placed therein. This ensures that the animal receives sufficient air, and allows the animal to see its surroundings and enjoy the trip.

Further objects, features, and advantages of the present invention will become apparent from the detailed description of the drawings which follows, when considered with the attached figures.

DETAILED DESCRIPTION OF THE PREFERRED EMBODIMENT

Figure 1:
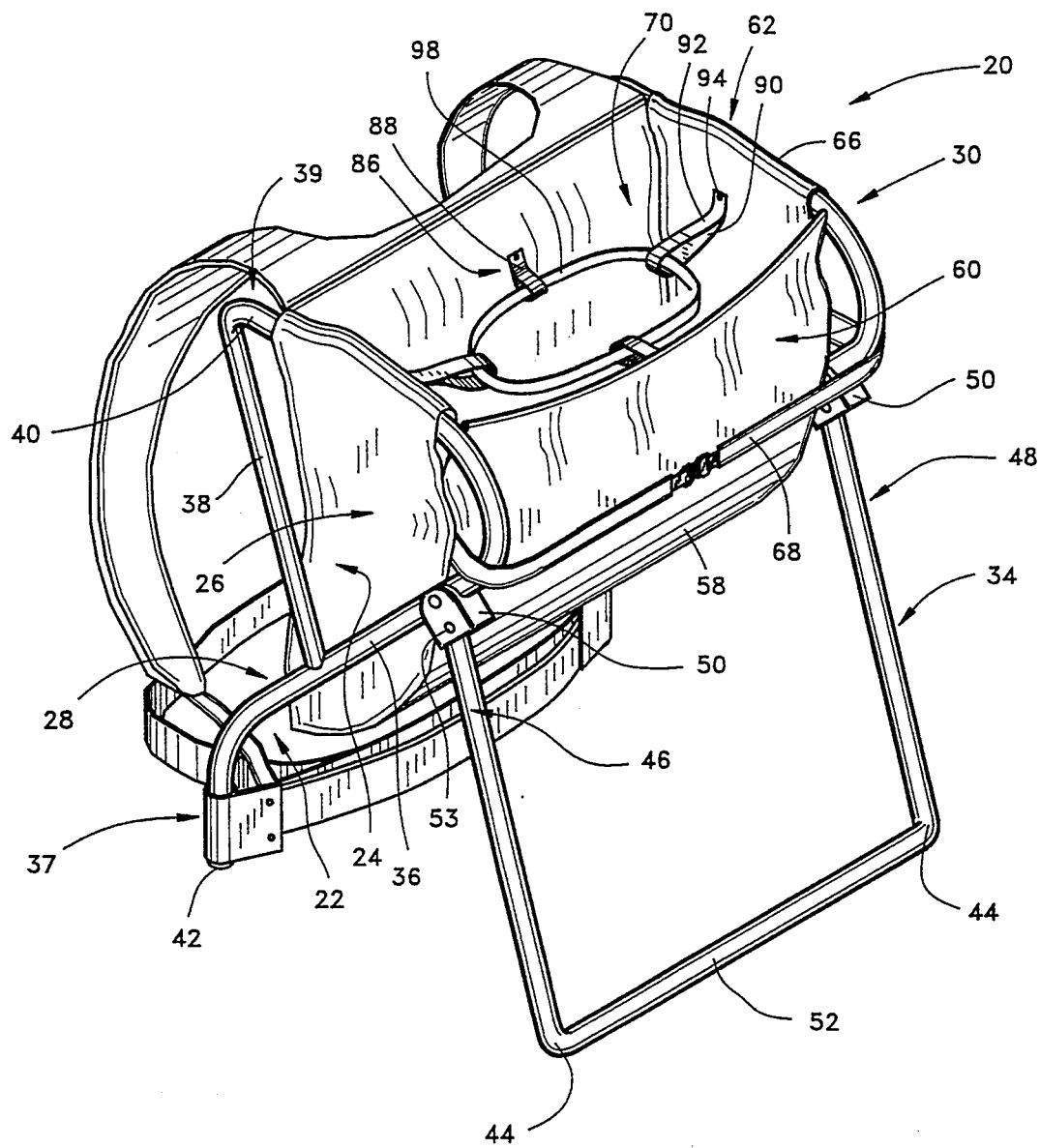
FIG. 1 is a perspective view of the backpack device of the present invention.

FIG. 1 illustrates the backpack device 20 of the present invention. In general, the backpack device 20 comprises support means 22, preferably in the form of a frame 24, and an animal enclosure 26.

The support means 22 of the device 20 support the enclosure 26, and any animal therein. Preferably, the support means 22 comprises a frame 24. The frame 24 may be of any design useful in supporting the enclosure 26 and an animal therein when the device 20 is located on the ground or seat of a car, and which allows a user to wear the device 20 on his or her body.

The frame 24 comprises first and second frame members or halves 28, 30 and a support leg 34 joined to the first and second halves 28, 30.

The first and second frame members 28, 30 are preferably matching halves of the frame 24, and thus the description herein shall be understood to apply to either member 28, 30. The frame members 28, 30 preferably include a frame support 36 and a strut 38. The frame support 36 of the frame members 28,30 preferably has a first free end 37, and a second end 39 at the connection of the support 36 to the strut 38. At the first end 37, the frame support 36 is primarily straight, so that when the frame 24 is in contact with the ground or other surface, it extends upward nearly perpendicular to the ground. Approximately 3-6 inches above along the support 36 from the first end 37, a bend is located in the support 36, such that when the frame 24 is sitting on a flat surface, an intermediate portion of the support 36 extends at approximately a 45-degree angle with respect to the ground. This portion of the support 36 is approximately 10-15 inches, and most preferably about 12 inches long, and is otherwise straight.

At the end of angled straight section, the support 36 bends back upon itself in a sharp "U" shaped fashion, ending at the second end 39. Near the second end 39 of the support 36, a flat section 40 exists which acts as a support for the enclosure 26. This section 40 is about 4-8 inches, and most preferably about 6 inches long from the bend in the support 36 to the second end 39, and when the frame 24 is resting on a flat surface, is parallel to that surface.

The strut 38 preferably connects the second end 39 of the frame support 36 with the straight intermediate section of the support between the first end 37 and the sharp bend. The strut 38 transmits downward forces applied to the flat enclosure support section 40 of the support 36 down to the lower portion of the support 36. The strut 38 is preferably welded or otherwise bonded or connected at each of its ends to the support 36.

Preferably, the support portion 36 and the strut 38 comprise a rod-shaped material, and preferably a tubular material. It is preferred that the frame 24 comprise aluminum tubing, as this material is resistant to corrosion, and is lightweight. It is possible for the frame 24 to comprise other materials, such as plastic. When the tubing is formed from aluminum, it is approximately 0.5-0.75 inches, and most preferably about ⅝ inches in diameter, and having a wall thickness of approximately 0.1-0.25 inches has been found sufficiently strong to support animals weighing about 20 pounds. Heavier tubing, including solid tubing, may be used if greater strength is required.

In order to allow the frame 24 to more easily sit upon the ground or other surfaces, the first end 37 of the support 36 preferably includes a foot 42. The foot 42 is preferably a plastic or rubber plug located in the first end 37 of the tubular support 36. When the support 36 comprises a hollow material, the foot 42 prevents material from entering the support 36. Further, the foot 42 includes a portion that contacts the end surface of the support 36, covering sharp edges, or the like, present on the end of the support. This is especially important when the frame 24 is made of metal.

The leg 34 is preferably "U" shaped and extends downwardly from the first and second frame member 28, 30, respectively. The leg 34 preferably includes a first and a second end 46, 48. The first end 46 is preferably hingedly connected to the first member 28, and the second end 48 is preferably connected to the second member 30 of the frame 26. The leg 34 preferably include a flat section 52 for engaging a surface such as the ground. When used with a frame halves 28,30 similar to those described above, the distance between the first and second ends 46, 48 to the flat section 52 of the leg 34 is about 10-14 inches, and most preferably about 12 inches, while the flat section 52 is approximately 10-14 inches, and most preferably about 12 inches long (meaning that the frame members 28, 30 are separated from one another by about 10-14 inches, and most preferably about 12 inches).

The leg 34 may include one or more feet located on the flat section 52 of the leg 34 for protecting the leg and providing additional support. If included, the feet 44 are preferably made of a durable plastic or rubber material.

The leg 34 is preferably made from a material which is light weight and strong, which resists the elements, and is tubular in shape. Most preferably, the leg 34 is made from the same tubular aluminum the remainder of the frame 24 is comprised of. A hinge 50 connects the first and second ends 46, 48 of the leg 34. The hinge 50 is preferably firmly attached to the first or second leg 28, 30 and includes a pin 53, or the like, about which the leg 34 may rotate.

Figure 6:
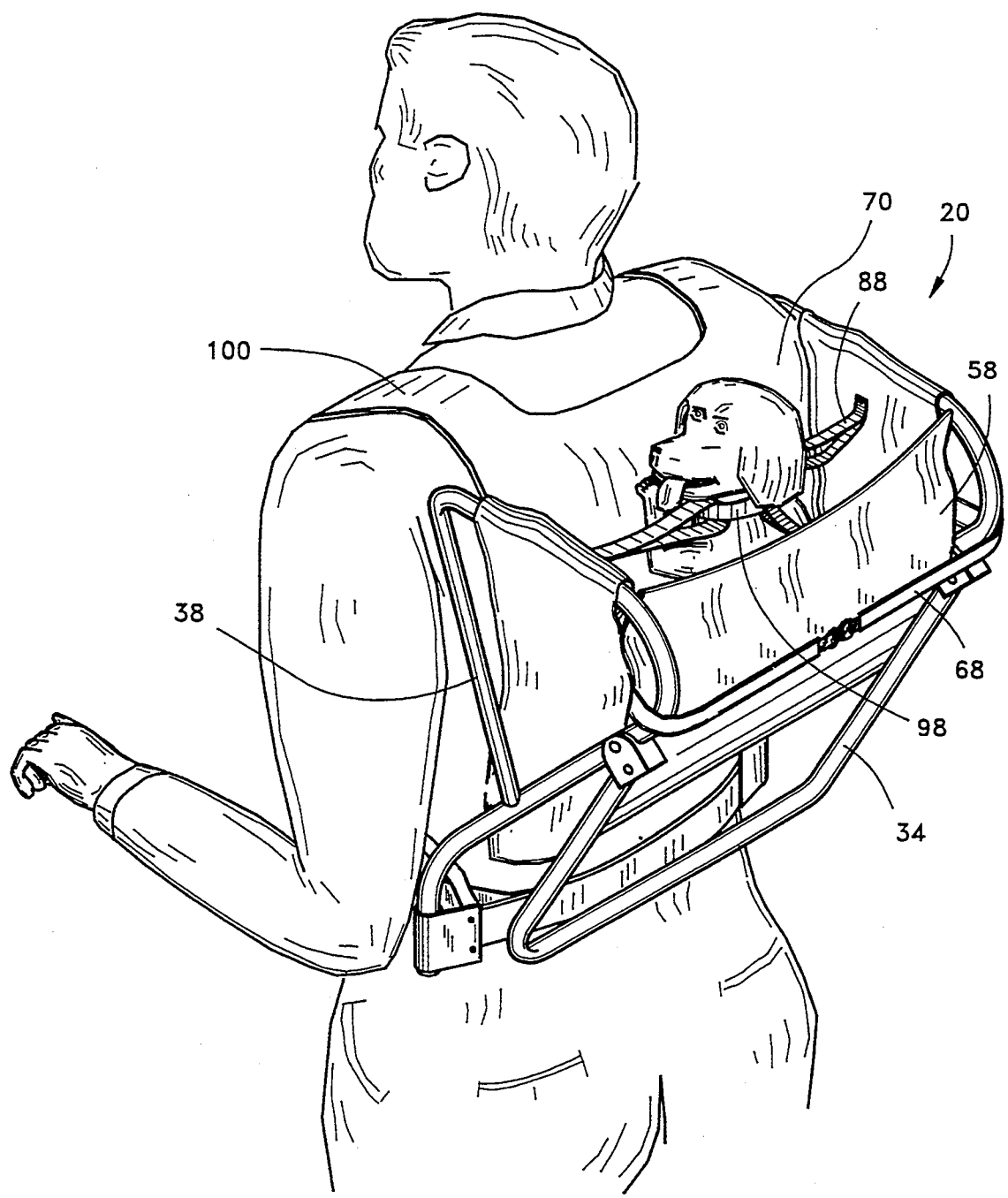
FIG. 6 is a perspective view of a user wearing the backpack device of FIG. 1.

Because the leg 34 is rotatable, a user may move the leg 34 into two positions. In a first position, the user may extend the leg 34 away from the first end 40 of the first and second member 28, 30. In this position, the first and second frame members 28, 30 and the leg 34 support the frame in an upstanding position. In a second position (as illustrated in FIG. 6), the user can position the leg 34 near the first and second members 28, 30 to minimize the amount of space occupied by the backpack device 20.

The enclosure 26, in which a user of the device 20 locates an animal, is preferably somewhat tubular in shape, having a closed bottom 54, an upwardly extending wall 58, and a top surface 62. The wall 58 includes a lower end 59 connected to said bottom 54, and a top end 60 opposite thereto, said top end 60 defining the top surface 62 of the device 20.

The enclosure 26 is preferably made of a breathable, washable, and durable cloth material. In particular, it is preferred that the enclosure 26 be made of canvas or another indoor/outdoor material. The enclosure 26 should comprise a material which is strong enough that when connected to the frame 24, will support therein an animal of around 20 pounds or so. Of course, if the enclosure 26 is to be used to support animals having greater or lesser weights, the material from which the enclosure 26 is constructed can be varied.

When constructed of material such as that described above, the enclosure 26 may be formed by connecting pieces comprising, in essence, four walls and a base: two side walls, a front and rear wall, and a bottom section. The exact dimensions of each piece depend primarily upon the size and shape of the frame. When the frame 24 is as described above, the enclosure 26 has a front to back distance of about 3-6 inches, and a side-to-side width of about 9-12 inches (which is the same as the distance between the first and second frame halves 28,30 set forth above less the space occupied by the material comprising the enclosure), and a depth from top surface 62 to bottom 54 of about 12-20, and most preferably about 15 inches. The exact size of the enclosure 26 may be varied depending upon the size of animal which a user intends to restrain, and the size of the frame 24.

Means for securing 64 the enclosure 26 to the frame 24 are provided. Preferably, the means 64 comprises loops 66 located on opposite sides of the enclosure 26 at the top end 60 of the wall 58. Each loop 66 fits around the tubing that comprises the flat section 40 of the frame support 36. Additionally, a strap 68 is connected to opposite sides of the wall 58, and traverses the enclosure 26 and the frame members 28, 30 just below the bend therein. The strap 68 preferably includes a buckle 69 or other connecting device, allowing the strap 68 to be opened and closed and adjusted about the frame 24.

It should be understood that the means for connecting 64 described are merely the preferred means for connecting the enclosure 26 to the frame 24. Numerous other means are contemplated, such as Velcro tabs, snaps, locking straps, clips, and other devices. Further, the exact arrangement of these means on the enclosure 26 and frame 24 will depend on the exact frame and/or enclosure configuration.

Figure 4:
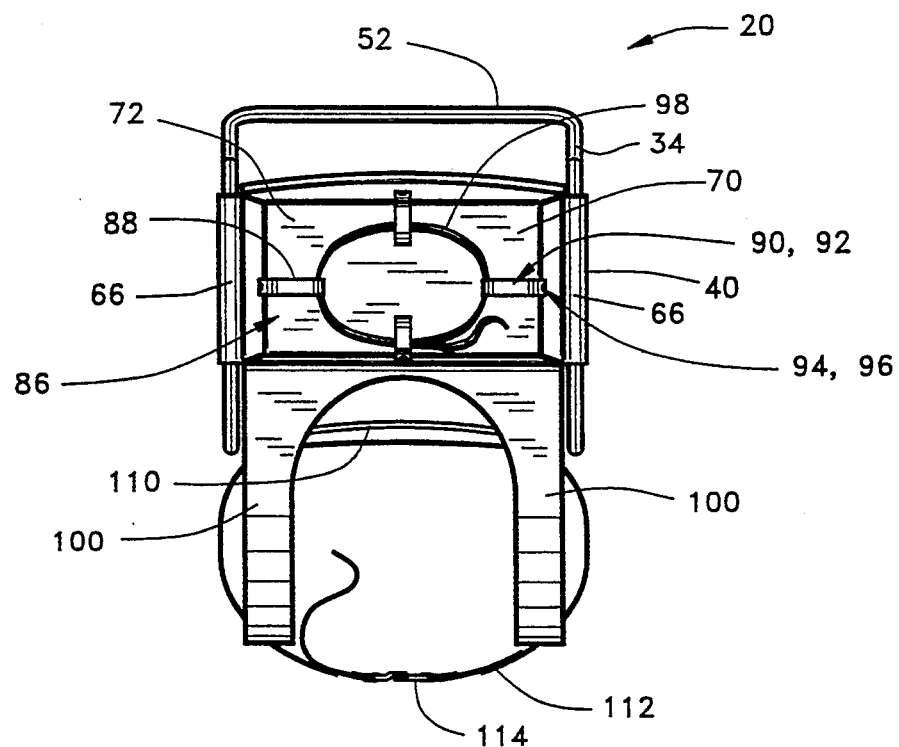
FIG. 4 is a top view of the backpack device of FIG. 1.

As illustrated in FIGS. 1 and 4, the enclosure 26 forms a cavity 70 into which a user may place an animal. The cavity 70 is defined by a lower animal support surface 72 and the upwardly extending wall 58. The lower animal support surface 72 normally comprises the bottom 54 of the enclosure. In the preferred form of the present invention, however, the position of the bottom 54 may be adjusted with respect to the remainder of the enclosure 26, causing the support surface 72 to comprise a surface other than the bottom 54.

In particular, means for adjusting 74 the position of the lower support surface 72 with respect to the top surface 62 of the enclosure are provided. These means 74 preferably comprises at least one, and preferably two, adjustable straps 76 connected to the enclosure near at the top 62 and bottom 54 thereof. The straps 74 preferably comprise a top section 78 connected to the wall 58 and having a first buckle member 80 thereon, and a second section 82 connected to the bottom 54 and having a second buckle member 84. At least one of the buckle members 80, 84 preferably includes an adjustment mechanism for adjusting the length of the strap. The buckle members 80, 84 can be locked and unlocked to one another. Other means known to those skilled in the art are contemplated for adjusting the position of the support surface 72. In particular, Velcro attachment means, snaps or other connectors could be used to adjust the position of a strap or the bottom 54 of the enclosure directly.

Figure 2:
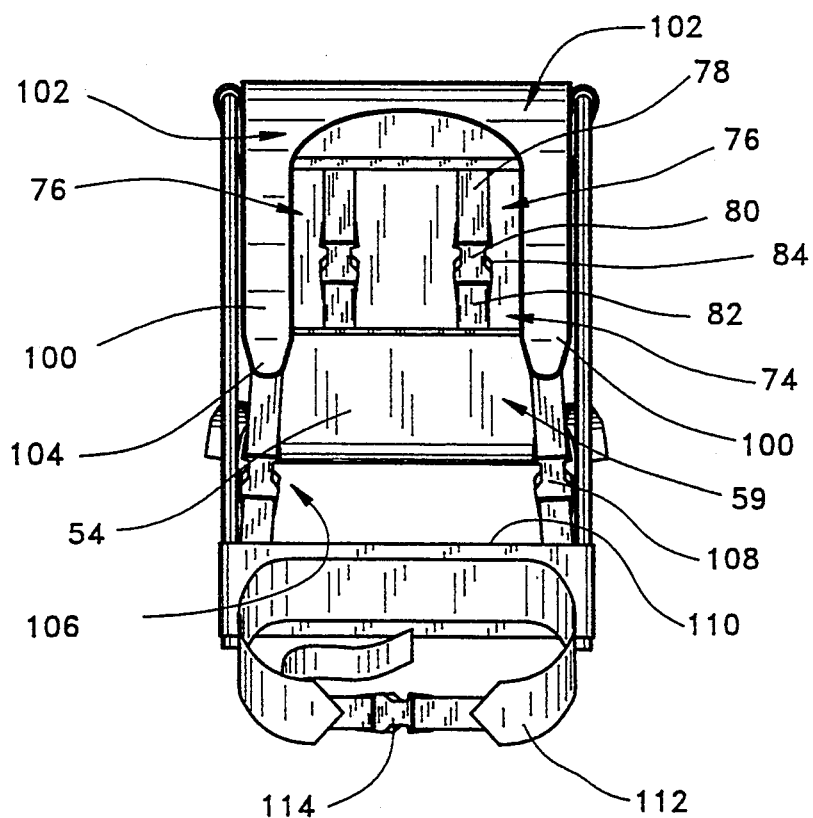
FIG. 2 is a rear view of the backpack device of FIG. 1 illustrating an enclosure thereof in a length adjusted position.
Figure 3:
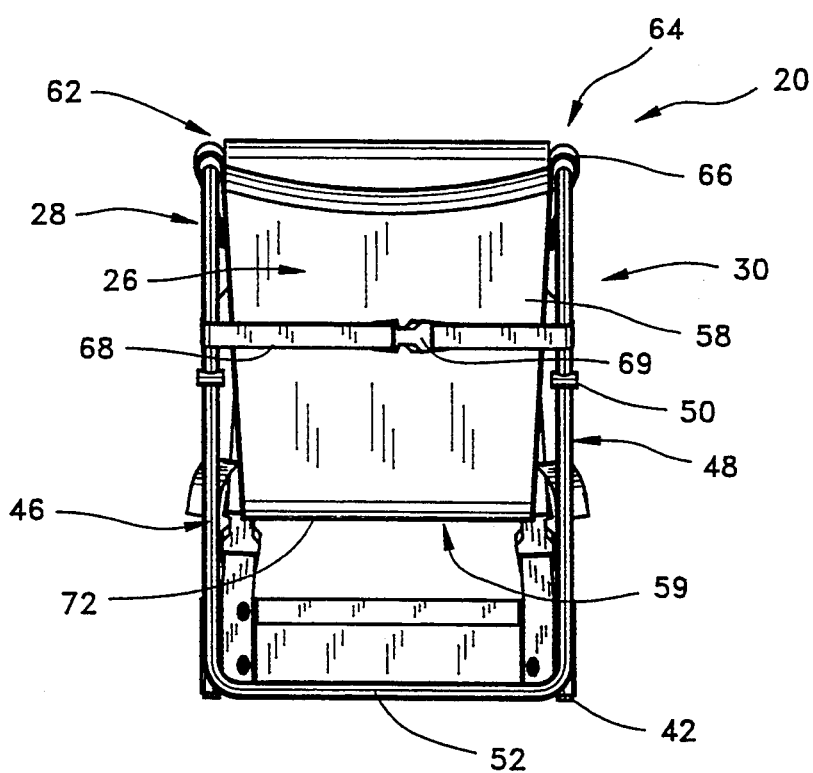
FIG. 3 is a front view of the backpack device of FIG. 1.
Figure 5:
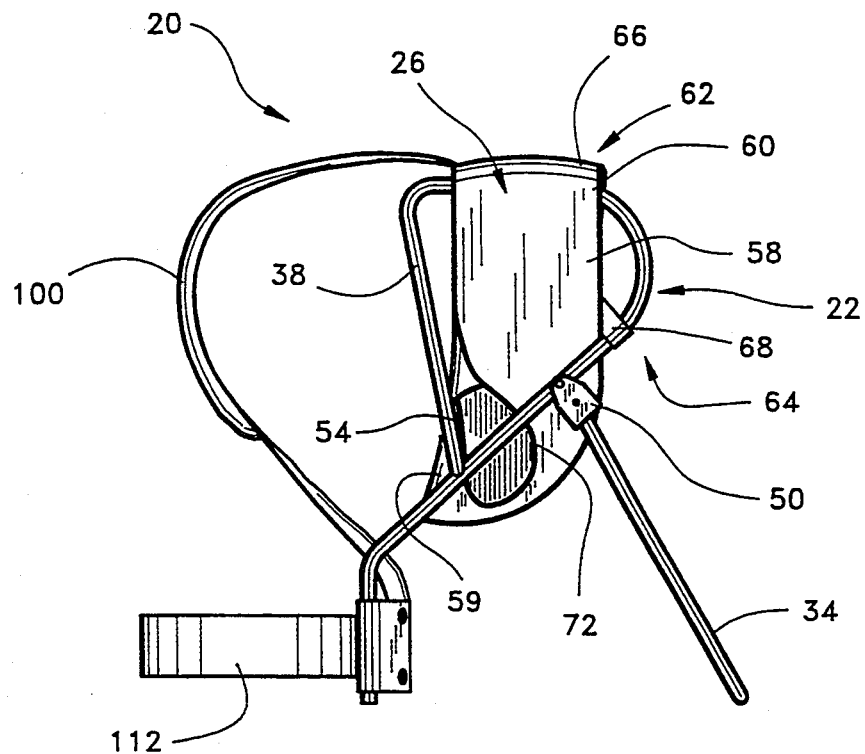
FIG. 5 is a side view of the backpack device of FIG. 1 illustrating the enclosure as shown in the condition illustrated in FIG. 2.

FIGS. 2 and 5 illustrate the enclosure 26 when in a position where a user has pulled on the adjustment means 74, causing the bottom 54 of the enclosure 26 to be located along the wall 58 thereof. Of course, the adjustment means 74 could be released such that the bottom 54 is directly below the top surface 62 of the enclosure 26, wherein the bottom 54 and animal support surface 72 are one and the same.

Means for restraining 86 an animal are preferably located in the enclosure 26. The means 86 preferably comprises four loops 88 located equidistantly about the inside surface of the enclosure 26 near the top surface 62.

The loops 88 preferably comprise a strong, durable material having a first end 90 connected to an inside surface of the enclosure 26, and a second end 92 having a snap 94 thereon for connection to a matching snap half 96 located near the first end 90 of the loop 88. Each loop 88 preferably extends inwardly toward the center of the cavity 70 by the same distance of about 3-5 inches when the inner circumference of the enclosure 26 is about 25-35 inches. In a second preferred embodiment, the loops 88 do not include a snap, and both ends of the strap are securely connected to the enclosure.

Each loop 88 is preferably connected to the enclosure about 1-4 inches down from the top surface 62. This allows for the distance between the animal's neck and head, such that when the animal is properly positioned with its head protruding slightly from the enclosure 26, the animal restraint means 86 are located at the animal's neck.

The loops 88 are designed to restrain a collar 98 or similar strap located about the animal's neck. The strap 98 may be included with the device 20, or may comprise the animal's own collar.

Other means for restraining 86 are contemplated as within the scope of the invention. For example, less than four loops 88 may be provided. Further, the means 86 might comprise a rigid frame located in the enclosure which surrounds and maintains the position of the animal, or a harness which encompasses the body of the animal instead of merely its neck. In fact, any means which fairly centrally locates the animal within the enclosure 26 and also restrains the animal therein, is contemplated.

In order to allow the device 20 to worn by a user, means for supporting the device 20 are provided. The means preferably comprises shoulder straps 100 and a waist strap 112. Preferably, there are two shoulder straps 100, each of which is formed as part of the wall 58, extending from the top end 60 thereof. The straps 100 are thus preferably made of the same durable and strong material as the remainder of the enclosure 26. Padding may be located on or in the material which comprises the straps 100 to render the device 20 more comfortable to a wearer.

Each of the straps 100 preferably includes a first end 102 and a second end 104. The first end 102 is connected to the wall 58. When the enclosure 26 is located on the frame 24, the straps 100 are located between the first and second frame support members 28, 30 on the side opposite to the leg 34.

The straps 100 are preferably about 12-15 inches long, and about 3-5 inches wide at their first end 102 and about 2-4 inches wide at their second end 104. In that the straps 100 fit users of various sizes, and to provide adjustment of the straps about the body of a user, a second adjustment strap 106 preferably connects the second end 104 of each of the straps 100 to the frame 24. The adjustment straps 106 preferably comprise thin, elongate members having at least one length adjustment mechanism 108. The length adjustment mechanism 108 is known in the art as a plastic or metal piece through which one end of the strap runs and which holds the strap in a fixed position with friction or a slidable lock. The adjustment straps 106 are preferably made of a very durable and strong material, such as nylon. The adjustment straps 106 are preferably connected to the frame 24 through the use of rivets or similar pins.

In order to further the wearability of the device 20, a waist support 110 and waist strap 112 are provided. The waist support 110 preferably comprises a fairly rigid cross member and a lightweight fabric material located between the first ends 37 of the frame members 28, 30. The cross member is preferably a plastic or metal member having some curvature thereto to match the shape of a user's back and is connected to the frame members 28, 30 at the first ends 37 thereof. The fabric material is preferably a canvas or durable mesh material stretched directly between the first ends 37 of the frame members 28, 30 and secured thereto.

The waist strap 112 is preferably an elongate strip of material which is connected at least along a portion thereof to the waist support 110, and which includes a buckle 114. The buckle 114 allows the length of the strap 112 to be adjusted, and allows the strap 112 to be opened and closed for positioning about a user.

Use of the device 20 by a user will now be described in conjunction with FIGS. 1-6. First, whether the user intends to wear the device 20 or secured it in an automobile or the like, a user locates an animal in the enclosure 26. A user locates the animal in the enclosure 26 by moving the leg 34 into its open position, and placing the device 20 on a surface. With the device 20 in this position, the leg 34 and the frame members 28, 30 provide a stable support for the device 20.

The user then opens the loops 88 in the enclosure 26, by unsnapping them. Next, the user gently lowers the animal into the cavity 70 of the enclosure 26 feet (or paws) first. The user preferably arranges the animal so that its head faces toward the shoulder straps 100 (i.e. away from the leg 34). The user then pulls the loops 88 around the animal's collar, and snaps them shut (or in the instance where the loops are permanently closed, the user runs the animal's collar through the loops and then closes the collar about the animal's neck). Once the user has the animal's collar secured about the animal and within the loops, the loops center the animal within the enclosure 26. Further, the loops in combination with the collar restrain the animal, preventing it from jumping out of the enclosure 26.

The user then adjusts the length of the enclosure 26 so that the animal's head is located just above the top surface 62 of the enclosure. A user accomplishes this by adjusting the straps 76 that connect the bottom 54 of the enclosure 26 to the wall 58. The user adjusts the straps 76 to manipulate the distance between the lower support surface 72 and the top surface 62.

When properly adjusted, not only is the animal held securely in the device 20, but because the animal's head is located above the top surface 62, the animal receives sufficient air, and can see its surroundings. Further, the central location of the animal in the enclosure 26 results in an air space between the animal and the material comprising the enclosure 26, preventing the animal from becoming too hot.

Once the user secures the animal in the device 20, the user may wear the device 20, or locate it in an automobile. For example, a user may buckle the device 20, with the animal secured therein, into the seat of an automobile. To accomplish this, the user simply sets the device 20 in the seat of the automobile with the leg 34 extending forwardly on the seat with the side of the enclosure 26 having the straps 100 thereon resting against the upwardly extending portion of the seat. The user then runs a seat belt across the device, securing it to the seat.

A user might also place the device 20, with the animal secured therein, on the floor of a vehicle. For example, because the device 20 provides rigid support and restraint of the animal, the device 20 might merely be placed on the floor of an automobile between the dash and front seat, or front and rear seats.

Most advantageously, a user may also wear the device 20 on his or her body. A user lifts the device 20, with the animal secured therein, and places his or her arms through the shoulder straps 100. The user slips one arm through one of the straps 100 on the device, and slowly lifts the device 20 while simultaneously placing the other arm through the other strap 100 until the straps 100 pass over each shoulder. The user then adjusts straps 106 to provide a snug fit and position the device 20 properly on one's back. Further, the user opens the buckle 114 on the waist strap 112, fits the strap 112 around the waist, and then locks and adjusts the strap to secure the lower portion of the frame 24 to the user. The user then folds the leg 34 inwardly toward the members 28, 30 to minimize the space occupied by the device 20.

When a user wears the device 20, the device 20 allows for easy transport of an animal. This is true whether the wearer is hiking, walking, cycling or the like. In any case, the animal is fully secure, safe, and is located in a position that permits maximum enjoyment by the user and animal. The animal restraint mechanism of the present invention prevents the animal from exiting the enclosure, and from shifting back and forth substantially within the enclosure. This feature is of especial importance, as when a user is wearing the device when cycling, substantial shifting of the animal could cause the user to lose his or her balance and crash.

Further, the animal's head is located in a fixed position regardless of its size, because of the collar/loop animal restraint mechanism. The central location of the animal the fact that its head it located above the enclosure means that the animal enjoys travel in the device, the animal being able to see in every direction.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. An animal restraint device in which an animal may be secured, comprising:
   a rigid frame including first and second leg members pivotally connected at a first end portion thereof, said leg members moveable between a first extended position in which said leg members can support said frame in an upstanding position and a collapsed second position for wearing of the device on the back of a user;
   an enclosure for containing an animal, said enclosure secured to said frame, said enclosure including a support surface for supporting the bottom of an animal, an upwardly extending side wall, and an open top surface; and
   means for selectively adjusting the distance between the support surface and the top of said side wall at said open top surface so that when an animal is placed in said enclosure and the bottom of said animal is resting on the support surface, the head of the animal is located near said top surface.

2. The device of claim 1, further including straps connected to said device for facilitating the wearing of the device by a user.

3. The device of claim 1, wherein said means for adjusting comprises at least one strap connected to said enclosure near a bottom surface thereof and said side wall.

4. The device of claim 3, wherein said strap comprises a first section connected to said side wall and having a first buckle member located thereon, and a second section connected to said base and having a second buckle member located thereon, said first and second buckle members capable of being locked and unlocked to one another.

5. The device of claim 3, further including means for adjusting the length of said strap.

6. The device of claim 1, wherein said enclosure further includes means for restraining an animal.

7. The device of claim 1, further including a waist strap connected to said frame.

8. An animal restraint device for containing and restraining an animal, comprising:
   a rigid frame, said frame comprising first and second frame halves, said frame halves including support members having first ends for contacting a surface and second ends including a flat portion and struts connecting the second ends of the support members to an intermediate portion of the support members, and a leg having first and second ends connected to said first and second frame halves respectively and a flat support portion located between said first and second ends;
   an enclosure for housing and restraining an animal secured to said frame, said enclosure having a bottom surface, an upwardly extending wall connected to said bottom surface, and an open top surface;
   means for restraining an animal located in said enclosure;
   means for adjusting the distance between an animal support portion of said enclosure and the top surface of said enclosure; and
   support means located on said frame or enclosure for allowing the device to be carried by a human.

9. The device of claim 8, wherein said means for adjusting comprises two straps having first ends connected to said enclosure near said bottom surface, and second ends connected to said wall of said enclosure.

10. The device of claim 8, wherein said means for restraining comprises four loops located equidistantly about an inside surface of said enclosure near said top surface thereof for location about the collar of an animal.

11. The device of claim 10, wherein said loops have a snap on a first end to allow that end to be disconnected from a second end of the loop.

12. The device of claim 8, wherein said support means comprises two shoulder straps connected to said enclosure, and a waist strap connected to said frame.

13. A device for facilitating the movement and restraint of an animal, comprising:
   a frame including a first elongate support member, a second elongate support member, and a third leg, said first and second support members having first end portions for contacting a surface and second end portions for supporting an enclosure, said third leg connected to said first and second support members;
   an enclosure for containing an animal, said enclosure secured to said frame, said enclosure including a bottom, an upstanding sidewall, and an open top surface; and
   means located at said top of said enclosure for restraining said animal centrally within said enclosure.

14. The device of claim 13, wherein said means for restraining comprises at least one loop attached to said enclosure on an inside surface thereof near said top surface.

15. The device of claim 14, further including a collar for location in said loops.

16. The device of claim 14, wherein said means comprises four loops located equidistantly about the inside surface of said enclosure.

17. The device of claim 14, wherein said loop includes a first end and a second end, at least one of said ends releasably secured to the other by a snap.

* * * * *